United States Patent
Maresko et al.

(10) Patent No.: US 8,393,568 B2
(45) Date of Patent: Mar. 12, 2013

(54) ENHANCED LUBRICATION SKEWED ROLLER CLUTCH ASSEMBLY AND ACTUATOR INCLUDING SAME

(75) Inventors: William A. Maresko, Grand Rapids, MI (US); Donald R. Cavalier, Walker, MI (US); Aaron M. Klap, Grand Rapids, MI (US)

(73) Assignee: Eaton Corporation, Cleveland, OH (US)

( * ) Notice: Subject to any disclaimer, the term of this patent is extended or adjusted under 35 U.S.C. 154(b) by 1128 days.

(21) Appl. No.: 12/420,305

(22) Filed: Apr. 8, 2009

(65) Prior Publication Data

US 2011/0006154 A1 Jan. 13, 2011

Related U.S. Application Data

(63) Continuation-in-part of application No. 11/458,001, filed on Jul. 17, 2006, now Pat. No. 7,690,597.

(51) Int. Cl.
*B64C 3/38* (2006.01)
*B64C 5/10* (2006.01)
*B64C 9/00* (2006.01)
*B64C 13/00* (2006.01)

(52) U.S. Cl. ......................... 244/99.2; 244/215; 244/216

(58) Field of Classification Search .................. 244/99.2, 244/213, 215, 216; 74/89.38, 89.39; 384/322, 384/371–373, 286, 397, 482, 606, 94, 130, 384/143, 410; 192/223.2, 45.006, 113.32
See application file for complete search history.

(56) References Cited

U.S. PATENT DOCUMENTS

| | | | | |
|---|---|---|---|---|
| 3,401,777 A * | 9/1968 | Williams | ..................... | 192/223.3 |
| 3,448,840 A * | 6/1969 | Rosin | ............................. | 192/223 |
| 3,643,589 A * | 2/1972 | Carter | ............................. | 100/49 |
| 3,802,281 A * | 4/1974 | Clarke | ............................ | 74/89.39 |
| 4,560,056 A * | 12/1985 | Stockton | ................... | 192/113.32 |
| 4,745,815 A * | 5/1988 | Klopfenstein | ................ | 74/89.25 |
| 4,834,225 A * | 5/1989 | Klopfenstein et al. | ......... | 192/223 |
| 5,195,721 A * | 3/1993 | Akkerman | ............... | 251/129.13 |
| 5,582,390 A * | 12/1996 | Russ | ............................ | 244/99.2 |
| 5,655,636 A * | 8/1997 | Lang et al. | ..................... | 192/223 |
| 5,743,490 A * | 4/1998 | Gillingham et al. | .......... | 244/99.9 |
| 5,944,148 A * | 8/1999 | Bae et al. | ....................... | 188/134 |
| 6,109,415 A * | 8/2000 | Morgan et al. | .............. | 192/223.1 |
| 6,237,434 B1 * | 5/2001 | Brown et al. | ............... | 74/424.82 |
| 6,672,540 B1 * | 1/2004 | Shaheen et al. | .............. | 244/99.3 |
| 7,080,721 B2 * | 7/2006 | Yamamoto et al. | ....... | 192/45.004 |
| 2004/0188214 A1 * | 9/2004 | Muramatsu et al. | ............ | 192/38 |

* cited by examiner

*Primary Examiner* — Philip J Bonzell
(74) *Attorney, Agent, or Firm* — Bradley J. Diedrich (57) ABSTRACT

A roller clutch assembly for use in an actuator is provided that includes a roller cage and at least one roller. A lubricating medium at least partially surrounds the roller cage and the roller. The roller cage includes at least one wiper configured to move the lubricating medium toward its functional location adjacent the rollers. An aircraft actuator for controlling movement of an aircraft flight control surface is also provided that includes a ball nut and a ball screw operatively connected to the flight control surface. A one-way roller clutch is operatively connected to the ball nut and substantially prevents rotation of the ball nut in a first direction in response to a compressive force on the ball screw. A roller clutch assembly according to the present invention is positioned between the ball nut and the one-way roller clutch.

14 Claims, 7 Drawing Sheets

ENHANCED LUBRICATION SKEWED ROLLER CLUTCH ASSEMBLY AND ACTUATOR INCLUDING SAME

CROSS-REFERENCE TO RELATED APPLICATIONS

This application is a continuation-in-part (CIP) of co-pending application U.S. Ser. No. 11/458,001, filed Jul. 17, 2006 now U.S Pat. No. 7,690,597 in the names of Don R. Cavalier and Aaron M. Kiap for a "Flap Actuator," which is incorporated by reference herein in its entirety.

FIELD OF THE INVENTION

This invention relates generally to aircraft flight control surface actuation, and in particular, to a roller clutch assembly for controlling operation and movement of a flight control surface actuator and an actuator including same.

BACKGROUND OF THE DISCLOSURE

The maneuverability of an aircraft depends heavily on the movement of hinged sections or flaps located at the trailing edges of the wings. By selectively extending and retracting the flaps, the aerodynamic flow conditions of the wings may be influenced so as to increase or decrease the lift generated by the wings. For example, during the take-off and landing phases of a flight, the position of the flaps of the aircraft are adjusted to optimize the lift and drag characteristics of the wing. It can be appreciated the reliable operation of the flaps is of critical importance to an aircraft.

BRIEF SUMMARY OF THE INVENTION

A roller clutch assembly for use in an actuator is provided that includes a roller cage and at least one roller. A lubricating medium at least partially surrounds the roller cage and the roller. The roller cage includes at least one wiper configured to move the lubricating medium toward its functional location adjacent the rollers. An aircraft actuator for controlling movement of an aircraft flight control surface is also provided that includes a ball nut and a ball screw operatively connected to the flight control surface. A one-way roller clutch is operatively connected to the ball nut and substantially prevents rotation of the ball nut in a first direction in response to a compressive force on the ball screw. A roller clutch assembly according to the present invention is positioned between the ball nut and the one-way roller clutch.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE PREFERRED EMBODIMENT

Figure 1:
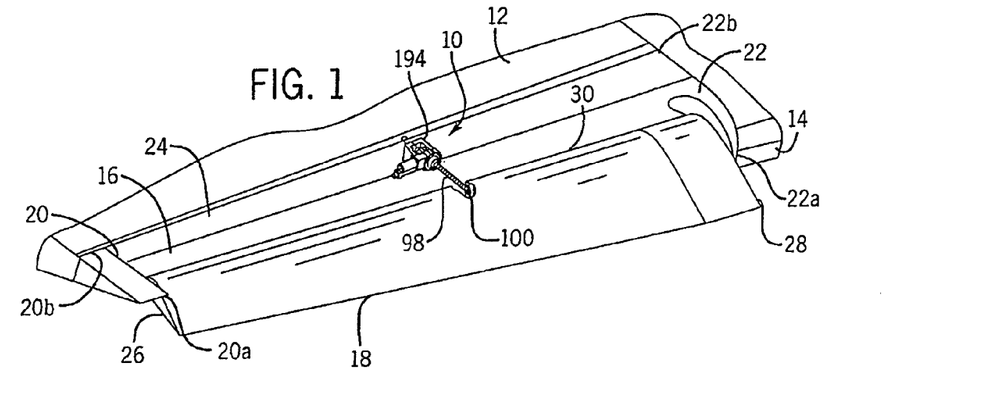
FIG. 1 is an isometric view of a flap actuator in accordance with the present invention mounted on a wing of a conventional aircraft.
Figure 2:
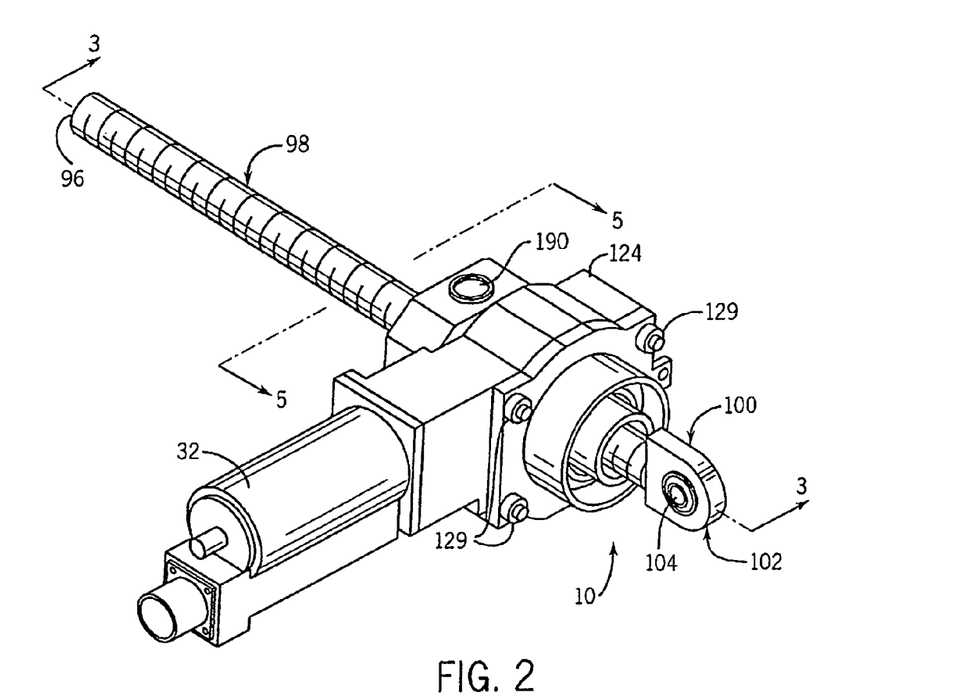
FIG. 2 is an isometric view of the flap actuator of the present invention.

Referring to FIGS. 1-2, a flap actuator in accordance with the present invention is generally designated by the reference numeral 10. As is conventional, an aircraft includes wing 12 projecting laterally from the fuselage (not shown). Wing 12 includes a forward end and a trailing end 14. Trailing end 14 of flap 18 includes flap receiving recess 16 formed therein for receiving flap 18. Flap receiving recess 16 in trailing end 14 of wing 12 is defined by first and second generally parallel sides 20 and 22, respectively. Trailing ends 20a and 22a of corresponding sides 20 and 22, respectively, intersect trailing edge 14 of wing 12. Leading ends 20b and 22b of corresponding first and second sides 20 and 22, respectively, intersect frame member 24 of wing 12. Frame member 24 projects laterally from and is operatively connected to the fuselage of the aircraft.

Flap 18 includes first side 26 pivotably connected to side 20 of wing 12 and second side 28 pivotably connected to side 22 of wing 12. As is conventional, flap 18 is pivotably about a longitudinal axis adjacent to and parallel to the leading edge 30 of flap 18 and movable between an extended and a retraction position. Flap actuator 10 interconnects flap 18 adjacent the leading edge 30 thereof to frame member 24 of wing 12 in order to control movement of flap 18.

Flap actuator 10 includes a brushless DC motor 32 rigidly connected to housing 124 in any suitable manner such as bolts or the like. Motor 32 is electrically coupled to a controller for receiving electrical power and converting the same into mechanical power. Motor 32 includes a drive shaft (not shown) rotatable in first and second directions in accordance with instructions received from the controller. It is intended that the mechanical power generated by motor 32 be transmitted to ball screw 98 through spur gear assembly 36, for reasons hereinafter described. It is noted that in the drawings, flap actuator 10 is orientated such that motor 32 projects away from the fuselage of the aircraft. It can be appreciated that flap actuator 10 may be orientated such that motor 32 projects toward the fuselage of the aircraft without deviating from the scope of the present invention.

Figure 4:
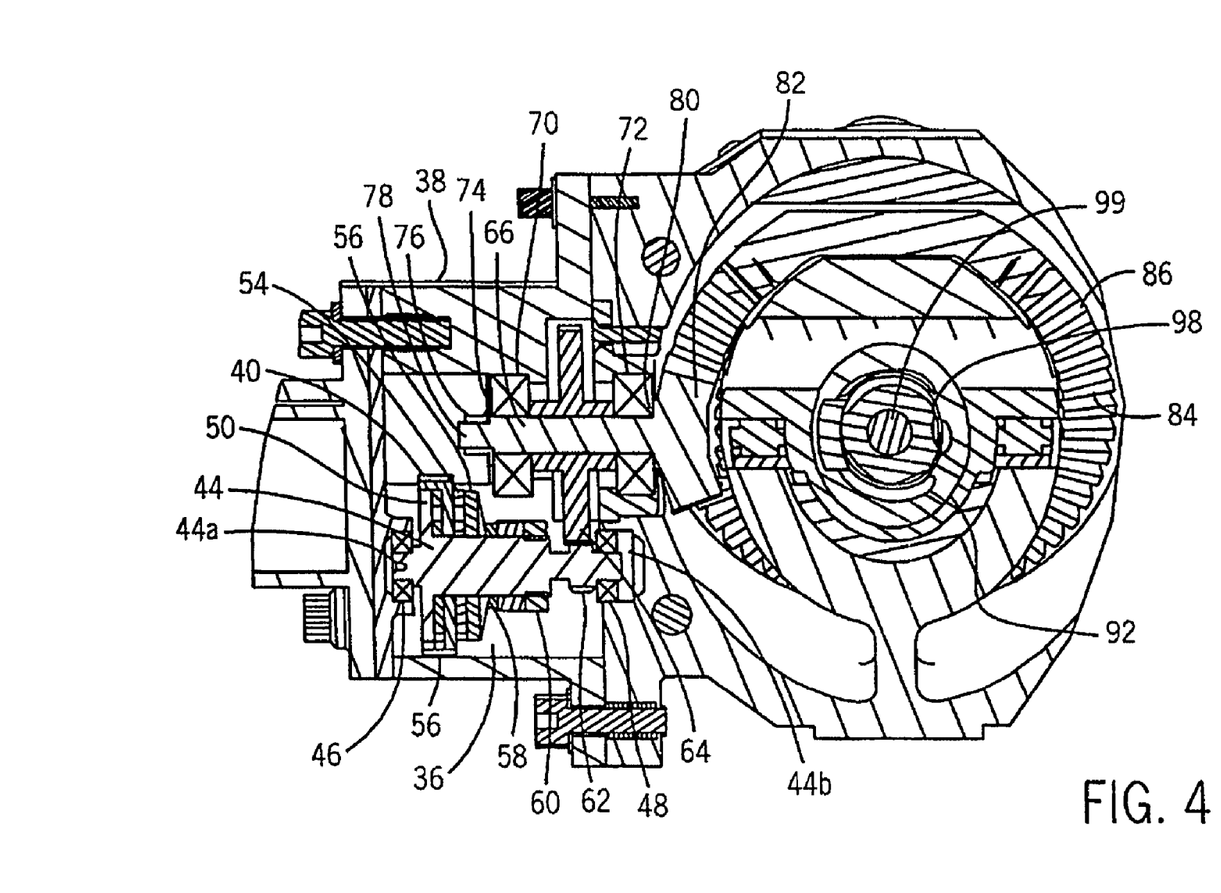
FIG. 4 is a cross-sectional view of a flap actuator of the present invention taken along line 4-4 of FIG. 3.

Referring to FIG. 4, spur gear assembly 36 includes clutch gear 40 mounted on clutch shaft 44 extending along a longitudinal axis. Clutch shaft 44 includes a first end 44a rotatably supported by bearing cage 46 and a second opposite end 44b supporting by bearing cage 48. Clutch shaft 44 further includes clutch plate 50 projecting radially from a location adjacent first end 44a. A first set of roller bearings 52 are captured between clutch plate 50 and a first side of clutch gear 40. A second set of roller bearings 54 are captured between a second side of clutch gear 40 and a first side of thrust plate 56 which extends about clutch shaft 44. Belleville spring 58 is captured between a second side of thrust plate 56 and adjustment nut 60 threaded onto clutch shaft 44. Pinion 62 projects radially from clutch shaft 44 adjacent second end 44b thereof.

When assembled, it is intended for belleville spring 58 to compress thrust plate 56, first and second roller bearings 52 and 54, respectively, and clutch gear 40 against clutch plate 50 so as to translate rotation (or more precisely, power) of clutch gear 40 to clutch shaft 44 under normal operating positions. In operation, the outer surface of drive shaft of motor 32 meshes with and drives clutch gear 40 in a user desired direction. If the torque generated on clutch gear 40 is below a predetermined threshold, rotation of clutch gear 40 is translated to clutch shaft 44. In the event that the torque on clutch gear 40 extends a predetermined threshold (e.g., if a downstream component of flap actuator 10 is locked in position), clutch gear 40 slips on clutch shaft 44 such that rotation of clutch gear 40 is not translated to clutch shaft 44. The torque threshold may be adjusted by varying the spring force generated by belleville spring 58 on thrust plate 56 via adjustment nut 60.

Pinion 62 meshes with and drives spur gear 64. Inner diameter of spur gear 64 is keyed to the outer diameter of bevel shaft 66. Bevel shaft 66 is rotatably supported by first and second bearing cages 70 and 72, respectively. Washer 74 and nut 76 combination are mounted on first end 78 of bevel shaft 66 to maintain first and second bearing cages 70 and 72, respectively, and spur gear 64 thereon. Second end 80 of bevel shaft 76 includes enlarged bevel pinion 82 projecting therefrom. Bevel pinion 82 meshes with teeth 84 of bevel gear 86 in order to translate rotation of bevel pinion 82 to bevel gear 86.

Figure 3:
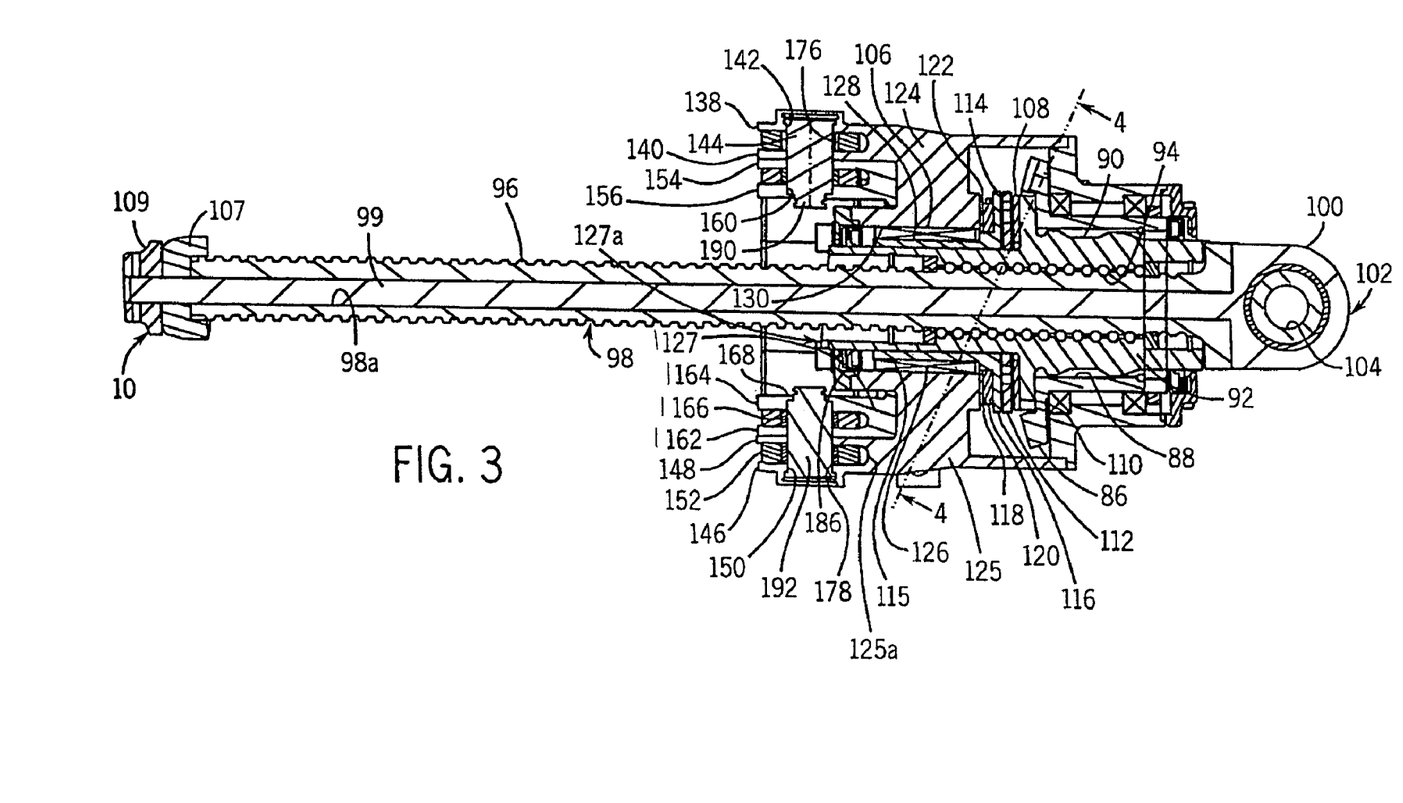
FIG. 3 is a cross-sectional view of the flap actuator of the present invention taken along line 3-3 of FIG. 2.

Referring to FIG. 3, bevel gear 86 has a splined inner surface 88 that meshes with outer surface 90 of ball nut 92. Threads 94 along the inner diameter of ball nut 90 mesh with threads 96 along the outer surface of ball screw 98 for reasons hereinafter described. Ball screw 98 further includes central passageway 98a adapted for receiving inner rod 99 therethrough. It is intended for inner rod 99 to maintain the integrity of ball screw 98 in the event of a fracture of ball screw 98. Inner rod 99, and hence ball screw 98, extends along a longitudinal axis and includes enlarged head 100 on a first end 102 thereof. Reinforced aperture 104 extends through head 200 of ball screw 98. As best seen in FIG. 1, head 100 of ball screw 98 is interconnected to wing 18 adjacent leading edge 30 thereof through aperture 104. Second end 105 of inner rod 99 includes a seal 107 and nut 109 combination secured thereon for maintaining ball screw 98 on inner rod 99 and preventing unwanted material from entering the central passageway 98a.

In order to prevent axial movement (from right to left in FIG. 3) of ball screw 98 under pressure of a compressive load on the surfaces of flap 18, and hence movement of flap 18 during operation of an aircraft, no-back assembly 106 is provided. No-back assembly 106 includes trailing thrust plate 108 and is positioned against shoulder 110 projecting radially from ball nut 92. Skewed roller 112 is positioned between trailing thrust plate 108 and leading thrust plate 114. Leading thrust plate 114 is generally tubular and includes an inner diameter about the outer periphery of ball nut 92 and plate element 116 projecting radially from a first end thereof. Thrust washer 118 and thrust bearing 120 are positioned between support surface 122 of housing 124 and plate element 116 of thrust plate 114. One-way roller clutch 126 is disposed between outer surface 128 of thrust plate 114 and inner surface 130 of housing 124.

Roller clutch 126 only allows rotation of thrust plate 114 in a single direction, e.g., clockwise. As such, with ball screw under a compressive load, thrust plate 108 engages skewed roller 112 and urges skewed roller against thrust bearing 120. Due to the friction developed between ball nut flange 110, thrust plate 108, skewed roller 112 and thrust plate 114, clutch roller 126 prevents further rotation of ball screw 98 in the clockwise direction.

Figure 5:
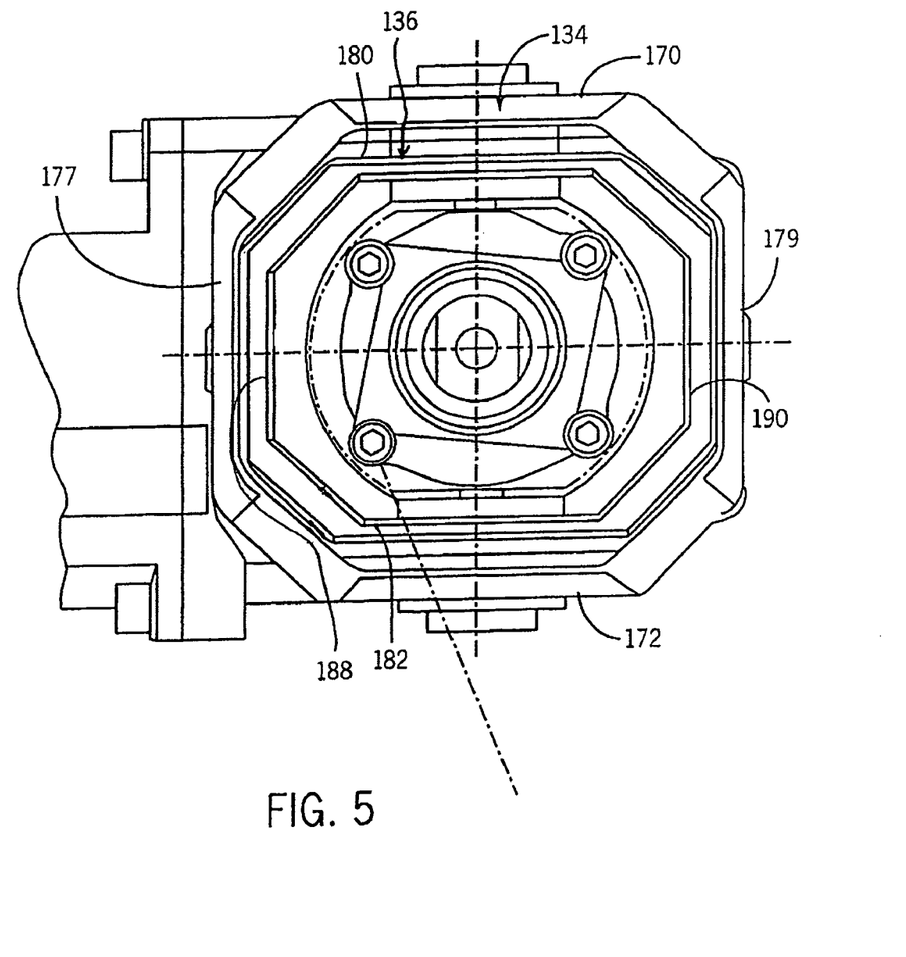
FIG. 5 is a cross-sectional view of a flap actuator of the present invention taken along line 5-5 of FIG. 2.

Housing 124 is interconnected to frame element 124 of wing 12 by primary and secondary gimbals 134 and 136, respectively, FIG. 5. As best seen in FIG. 3, it is contemplated for housing 124 to include main portion 125 and secondary portion 127 attached thereto by a plurality of through bolts 129, FIG. 2. Housing 124 includes spaced upper primary gimbal mounting tabs 138 and 140, respectively, projecting from leading end 125a of main portion 125 of housing 124. Upper primary gimbal mounting tabs 138 and 140, respectively, are generally U-shaped and include corresponding apertures 142 and 144, respectively, therethrough. Spaced lower primary gimbal mounting tabs 146 and 148, respectively, project from leading end 125a of main portion 125 of housing 124. Lower primary gimbal mounting tabs 146 and 184 are generally U-shaped and include corresponding apertures 150 and 152, respectively therethrough. Apertures 142 and 144 through upper primary gimbal mounting tabs 138 and 140, respectively, are axially aligned with apertures 150 and 152 though corresponding lower primary gimbal mounting tabs 146 and 148, respectively, for reasons hereinafter described.

Housing 124 further includes spaced upper secondary gimbal mounting tabs 154 and 156, respectively, extending from leading end 127a of secondary portion 127 of housing 124. Upper secondary gimbal mounting tabs 154 and 156 are generally U-shaped and include corresponding apertures 158 and 160, respectively, therethrough. Spaced lower secondary gimbal mounting tabs 162 and 164, respectively, project from leading end 127a of secondary portion 127 of housing 124. Lower secondary gimbal mounting tabs 162 and 164 are generally U-shaped and include corresponding apertures 166 and 168, respectively, therethrough. Apertures 158 and 160 through upper secondary gimbal mounting tabs 154 and 156, respectively, and apertures 166 and 168 through lower secondary gimbal mounting tabs 162 and 164, respectively, are axially aligned with each other and with apertures 142, 144, 150 and 152.

Referring back to FIG. 5, primary gimbal 134 has a generally square configuration and is defined by upper and lower walls 170 and 172, respectively having apertures 176 and 178, respectively, therethrough. Primary gimbal 134 is further defined by first and second sidewalls 177 and 179, respectively, having corresponding apertures (not shown) therethrough, for reasons hereinafter described.

Secondary gimbal 136 also has a square-like configuration and includes upper and lower walls 180 and 182, respectively. Upper and lower walls 180 and 182, respectively, of secondary gimbal 136 include corresponding apertures 184 and 186, respectively therethrough. In addition, secondary gimbal 136 is defined by first and second sidewalls 188 and 190, respectively, having corresponding apertures (not shown) therethrough.

In order to mount housing 124 to wing 12, upper gimbal 134 is positioned such that upper wall 170 of primary gimbal 134 is received between upper primary gimbal mounting tabs 138 and 140 and such that lower wall 172 of primary gimbal 134 is received between lower primary gimbal mounting tabs 146 and 148. In addition, aperture 176 through upper wall 170 of primary gimbal 134 is axially aligned with apertures 142 and 144 through upper primary gimbal mounting tabs 138 and 140, respectively, and such that aperture 178 through lower wall 172 of primary gimbal 134 is axially aligned with apertures 150 and 152 through primary gimbal mounting tabs 146 and 148, respectively.

Secondary gimbal 136 is positioned such that upper wall 180 of secondary gimbal 136 is received between upper secondary gimbal mounting tabs 154 and 156 and such that lower wall 182 of secondary gimbal 136 is received between lower secondary gimbal mounting tabs 146 and 148. Aperture 184 through upper wall 180 of secondary gimbal 136 is axially aligned with apertures 158 and 160 through upper secondary gimbal mounting tabs 154 and 156, respectively, and aperture 186 through lower wall 182 of secondary gimbal 136 is axially aligned with apertures 166 and 168 through lower secondary gimbal mounting tabs 162 and 164, respectively.

Once primary and secondary gimbals 134 and 136, respectively, are positioned as heretofore described, upper pin 190 is inserted through aperture 142 in upper primary gimbal mounting tab 138; aperture 176 through upper wall 170 of primary gimbal 134; aperture 144 through upper primary gimbal mounting tab 140; aperture 158 through upper secondary gimbal mounting tab 154; aperture 184 through upper wall 180 of secondary gimbal 136; and aperture 160 through upper secondary gimbal mounting tab 156. In addition, pin 192 is inserted through aperture 150 in lower primary gimbal mounting tab 146; aperture 178 through lower wall 172 of primary gimbal 134; aperture 152 through lower primary gimbal mounting tab 148; aperture 166 through lower secondary gimbal mounting tab 162; aperture 186 through lower wall 182 of secondary gimbal 136; and through aperture 168 through lower secondary gimbal mounting tab 164. Thereafter, primary gimbal 134 is positioned within mounting bracket 194 projecting in a trailing direction from frame element 24 of wing 12. Spherical bearings incorporating a mounting pin are seated in the aperture in sidewall 177 of primary gimbal 134 and in the aperture in sidewall 188 of secondary gimbal 136 to rigidly connect flap actuator 10 to mounting bracket 194. Similarly, spherical bearings incorporating a mounting pin are seated in the aperture in sidewall 179 of primary gimbal 134 and in the aperture in sidewall 190 of secondary gimbal 136 to rigidly connect flap actuator 10 to bracket 194.

In operation, a controller, responsive to pilot control, actuates motor 32 so as to rotate the drive shaft in a user desired direction. Spur gear assembly 36 translates rotation of the drive shaft to bevel gear 86 which, in turn, rotates ball nut 92 about the longitudinal axis of inner rod 99. Rotation of ball nut 92 is translated to ball screw 98 which, in turn, moves linearly along the longitudinal axis of inner rod 99. By way of example, rotation of ball nut 92 in a clockwise direction causes ball screw 98 to move in a first linear direction and rotation of ball nut 92 in a counterclockwise direction causes ball screw 98 to move in a second opposite linear direction. In such manner, ball screw 98 may be moved from an extended position to a retracted position, thereby allowing the position of flap 10 to be adjusted.

During operation of the aircraft, a compressive force (from right to left in FIG. 3) may be provided on first end 102 of inner rod 99 and on ball screw 98 by flap 18. This compressive force is translated through no-back assembly 106, as heretofore described, to housing 124. Thereafter, the compressive load is translated through pins 190 and 192 to primary and second gimbals 134 and 136, respectively, and though the spherical bearings of the primary and second gimbals 134 and 136, respectively, to wing 18. It can be appreciated that the arrangement of flap actuator 10 provides redundant load sharing of any compressive force generated by a load on flap 18. For example, the load may be translated solely by ball screw 98 if inner rod 99 is disabled and visa-versa. Similarly, the load may be translated solely by secondary portion 127 of housing 124 if main portion 125 of housing 124 is disabled and visa-versa or the load may be translated solely by secondary gimbal 136 if primary gimbal 134 is disabled or visa-versa.

Figure 6:
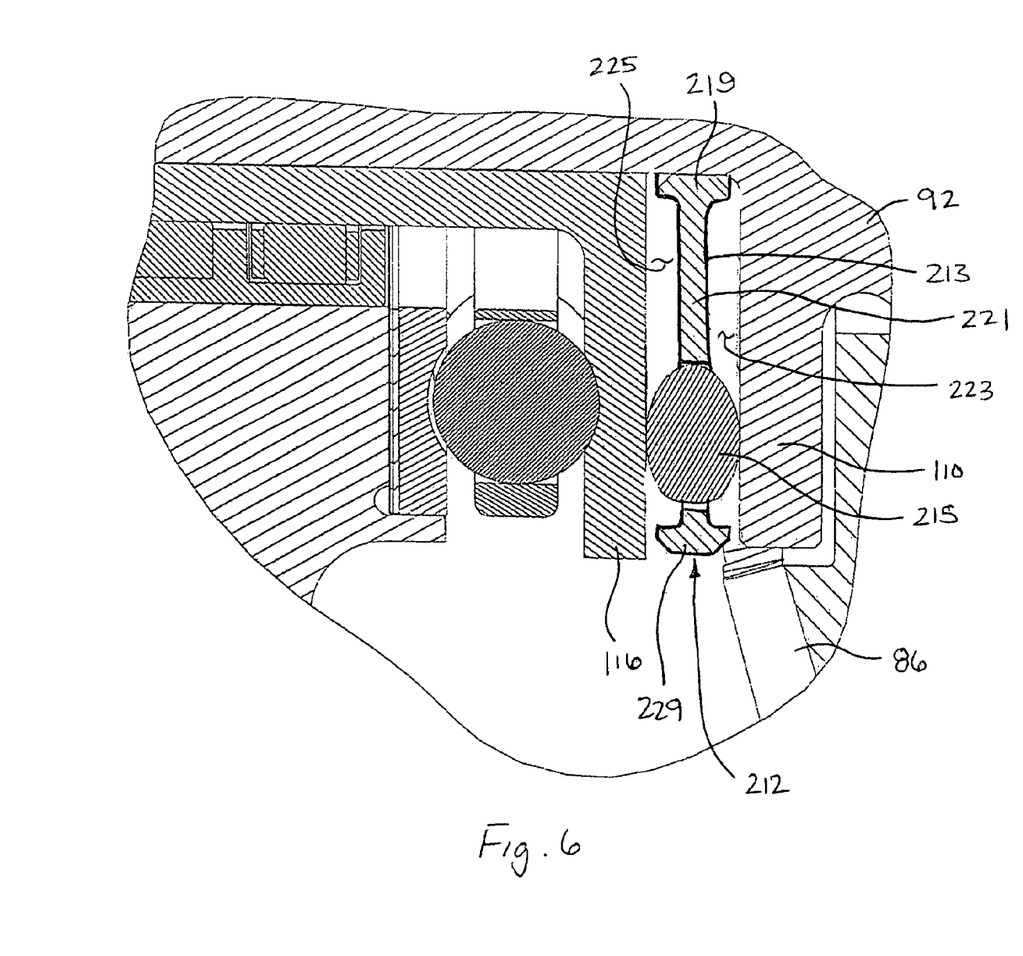
FIG. 6 is an enlarged cross-sectional view of a flap actuator, including a roller clutch assembly according to an embodiment of the present invention.
Figure 7:
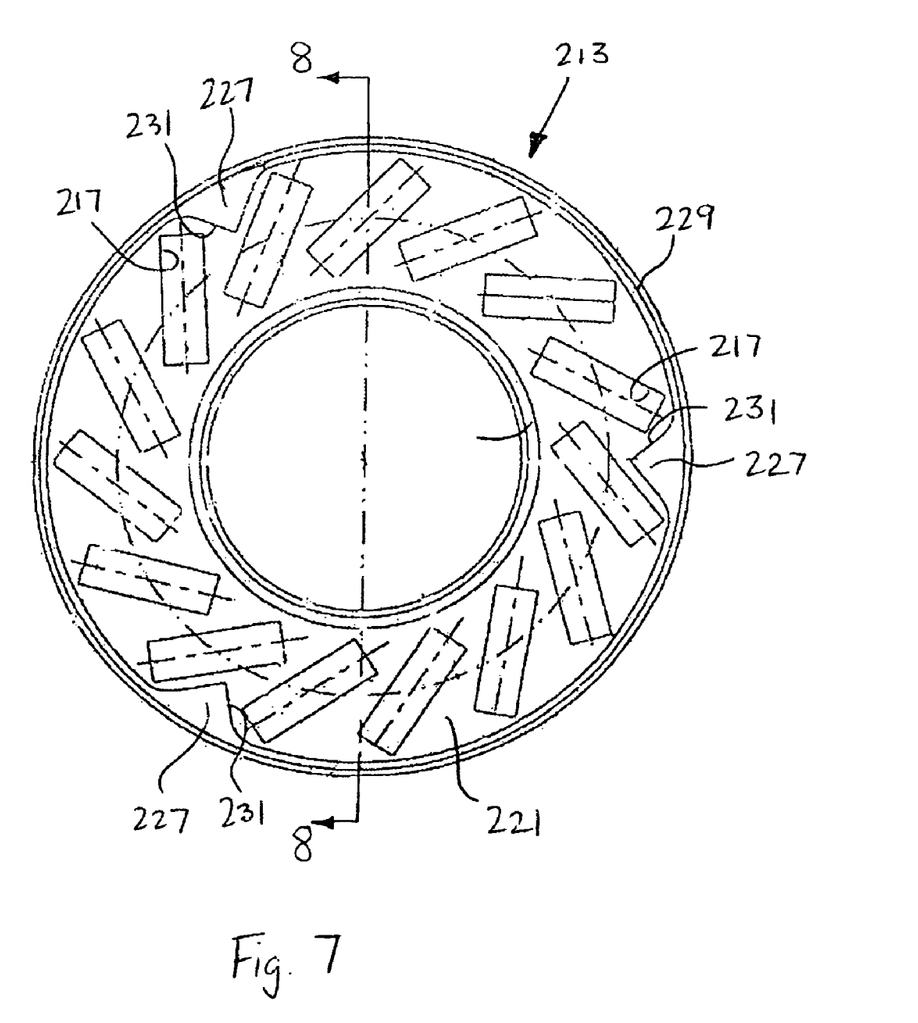
FIG. 7 is a side view of a roller cage according to an embodiment of the present invention.
Figure 8:
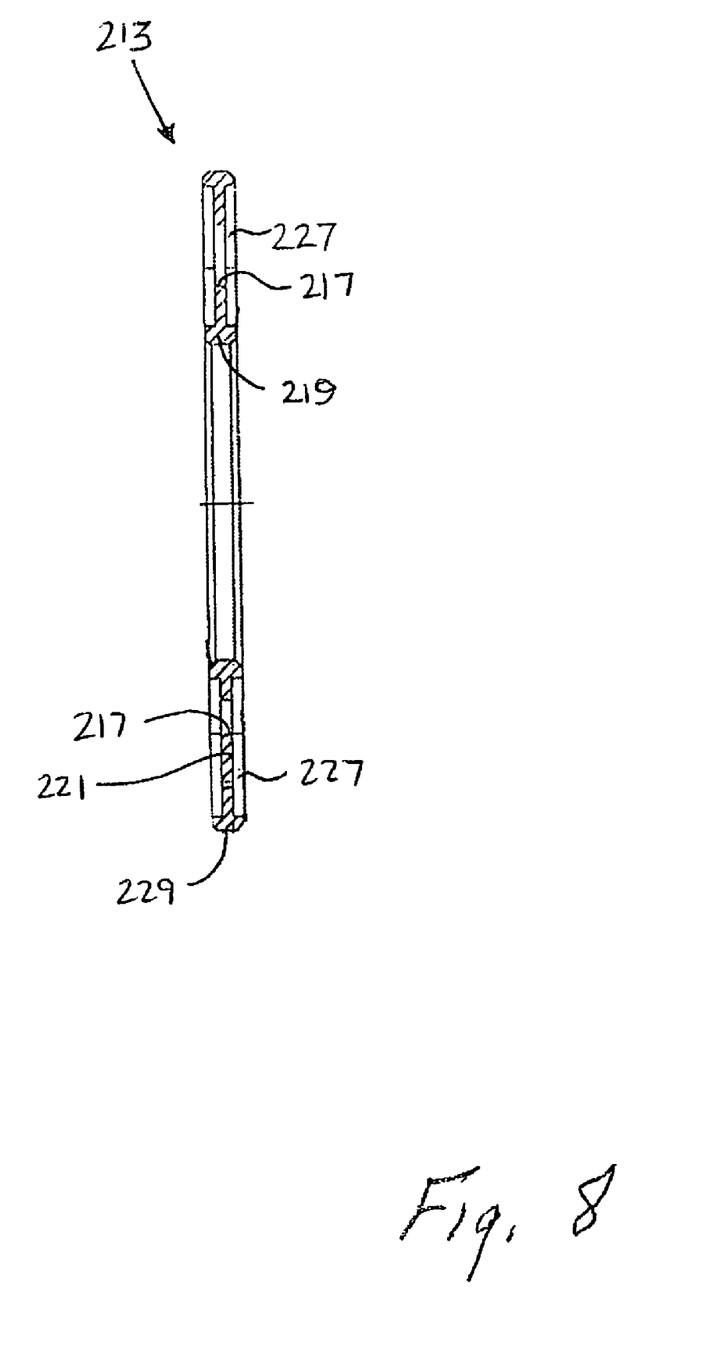
FIG. 8 is a cross-sectional view of the roller cage of FIG. 7.

Referring to FIGS. 6-8, another embodiment of the present invention is shown. A roller clutch assembly 212 is positioned between shoulder 110, projecting radially from ball nut 92, and plate element 116, and is at least partially surrounded by a lubricating medium (not shown), such as, for example, grease. Roller clutch assembly 212 includes a roller cage 213 and a plurality of generally cylindrical rollers 215. Rollers 215 are received in apertures 217 that are skewed radially, resulting in the generally oblong-shaped cross-section of rollers 215 shown in FIG. 6. Roller cage 213 includes an inner hub 219 and a radially outwardly extending webbing 221 having a width less than the width of hub 219. Such a configuration provides an annular volume for containment of the lubricating medium in spaces 223, 225 between the webbing 221 and shoulder 110 and plate element 116, respectively.

Referring specifically to FIGS. 7 and 8, roller cage 213 also includes at least one wiper 227 that functions to redistribute (in the illustrated embodiment radially inwardly) the lubricating medium that has moved radially outwardly and away from the rollers 215 due at least in part to the skewed orientation of rollers 215. In an embodiment, wiper 227 is positioned proximate a distal end 229 of roller cage 213. In the illustrated configuration, wiper 227 and distal end 229 both have a width greater than the width of webbing 221. The width of distal end 229 creates a lip, which functions to contain the lubricating medium during dynamic operating conditions (e.g., rotation of cage 213). As shown in FIG. 7, a plurality of wipers 227 (e.g., three) may be spaced apart at predetermined angles (e.g., 120°) to facilitate more uniform redistribution of the lubricating medium.

During operation, one-way roller clutch 126 is operatively connectable to ball nut 92 to activate roller clutch assembly 212 when there is compressive (aiding) load and the actuator is being commanded to move in the retracting direction. Roller clutch assembly 212 engages the housing and substantially prevents rotation of ball nut 92 in a first direction, proportional in magnitude to the compressive (aiding) force on the ball screw by flap 18. As roller cage 213 rotates, at least one surface 231 of wiper 227 contacts the lubricating medium and moves it radially inwardly toward its functional location adjacent rollers 215 using a plowing effect. The skewed orientation of rollers 215, in combination with the lubricating medium results in a predictable braking torque proportional to the compressive (aiding) load. This proportional braking function prevents actuator 10 from being back-driven and running away during retraction.

While roller clutch assembly 212 is particularly well suited for use in actuator 10, its use is not intended to be limited thereto. Roller clutch assembly 212 may also be employed in other actuator mechanisms that include or require, for example, roller clutches, torque limiters, or other rotational devices that transmit a thrust load.

Various modes of carrying out the invention are contemplated as being within the scope of the following claims particularly pointing out and distinctly claiming the subject matter that is regarded as the invention.

What is claimed is:

1. An aircraft actuator for controlling movement of an aircraft flight control surface, comprising:
   a housing having a leading end and a trailing end;
   a ball nut rotatably supported in the housing;
   a ball screw extending along a longitudinal axis and having a terminal end operatively connectable to the flight control surface, the ball screw movable between a first retracted position and a second extended position in response to rotation of the ball nut;
   a one-way roller clutch operatively connectable to the ball nut, the roller clutch engaging the housing and substantially preventing rotation of the ball nut in a first direction in response to a compressive force on the ball screw by the flight control surface; and a roller assembly positioned between the ball nut and the one-way roller clutch and at least partially surrounded by a lubricating medium, the roller assembly including a roller cage and at least one roller, the roller cage including at least one wiper configured to move the lubricating medium toward its functional location adjacent the rollers.

2. The actuator of claim 1, wherein the roller cage includes an aperture1 for receiving the roller that is skewed radially.

3. The actuator of claim 1, wherein the roller cage includes a plurality of wipers spaced apart at predetermined angles.

4. The actuator of claim 1, wherein the wiper is configured to move the lubricating medium surrounding the roller assembly radially inwardly toward the roller using a plowing effect.

5. The actuator of claim 1 further comprising an inner bar extending through the ball screw.

6. The actuator of claim 1, wherein the roller cage includes an inner hub and a radially extending webbing having a width less than the width of hub.

7. The actuator of claim 6, wherein the wiper is positioned proximate a distal end of the roller cage, the wiper and the distal end having a width greater than the width of the webbing.

8. The actuator of claim 1, further including a gimbal assembly that includes:
a first gimbal for interconnecting the housing to a wing; and
a second gimbal for interconnecting the housing to the wing.

9. The actuator of claim 8, wherein the gimbal assembly includes a mounting pin extending through the first gimbal and being operatively connectable to the wing.

10. The actuator of claim 8, wherein the gimbal assembly includes first and second pins extending between the housing and the first gimbal.

11. The actuator of claim 10, wherein the first and second pins interconnect the second gimbal to the first gimbal and the housing.

12. The actuator of claim 1, further comprising;
a motor having a rotatable drive shaft, the drive shaft rotatable in first and second opposite directions; and
a gear assembly for translating rotation of the drive shaft to the ball nut.

13. The actuator of claim 12, wherein the gear assembly includes a clutch, the clutch disengaging the drive shaft from the ball nut in response to a predetermined force thereon.

14. An aircraft flight control surface actuator for controlling movement of a flight control surface on a wing of an aircraft, comprising:
a housing having a leading end and a trailing end;
a ball nut rotatably supported in the housing;
a ball screw extending along a longitudinal axis and having a terminal end operatively connectable to the flight control surface, the ball screw movable between a first retracted position and a second extended position in response to rotation of the ball nut;
a one-way roller clutch operatively connectable to the ball nut, the roller clutch engaging the housing and preventing rotation of the ball nut in a first direction in response to a compressive force on the ball screw by the flight control surface; and
a roller assembly positioned between the ball nut and the one-way roller clutch and at least partially surrounded by a lubricating medium, the roller assembly including a roller cage and at least one roller, the roller cage including:
an inner hub;
a radially extending webbing having a width less than the width of the inner hub and an aperture for receiving the roller that is skewed radially; and
at least one wiper positioned proximate a distal end of the roller cage and having a width greater than the width of the webbing, the wiper configured to move the lubricating medium radially inwardly toward its functional location adjacent the roller.

* * * * *